United States Patent [19]

Yamada et al.

[11] Patent Number: 5,775,798
[45] Date of Patent: Jul. 7, 1998

[54] INSERT MOLDED ARTICLE FOR USE IN A MOTOR VEHICLE INTERIOR LAMP OR THE LIKE

[75] Inventors: Atsushi Yamada; Tadayuki Okuda, both of Shimizu, Japan

[73] Assignee: Koito Manufacturing Co., Ltd., Tokyo, Japan

[21] Appl. No.: 628,890

[22] Filed: Apr. 5, 1996

[30] Foreign Application Priority Data

Apr. 6, 1995 [JP] Japan .................. 7-104569

[51] Int. Cl.[6] .................................... H01R 33/00
[52] U.S. Cl. .................. 362/226; 174/52.2; 362/74
[58] Field of Search .............. 174/52.2; 362/226, 362/80, 74, 83.3

[56] References Cited

U.S. PATENT DOCUMENTS 5,207,501  5/1993  Sakuma et al. .................. 362/137
5,430,624  7/1995  Yoshida et al. .................. 362/74
5,466,887  11/1995 Hasegawa .................. 174/52.2
5,588,202  12/1996 Ehlers et al. .................. 174/52.2

Primary Examiner—Stephen F. Husar
Attorney, Agent, or Firm—Koda & Androlia

[57] ABSTRACT

A motor vehicle interior lamp is disclosed which has a lamp body of plastics material on which an electric lighting bulb is mounted by being supported between a pair of bulb terminals. One of the bulb terminals is connected to a power supply. For selectively grounding the other bulb terminal via a hand operated switch, a grounding conductor is embedded in the lamp body by insert molding. The grounding conductor is fabricated from sheet metal in one piece with a set of grounding terminals to be grounded by fastener elements. The grounding conductor is connected to each grounding terminal via an offset link which is capable of deformation in response to possible deformation or displacement of the grounding conductor during the insert molding of the lamp body and which is thus effective to hold the grounding terminals with their mounting holes in register with the mounting holes in the lamp body.

1 Claim, 9 Drawing Sheets

INSERT MOLDED ARTICLE FOR USE IN A MOTOR VEHICLE INTERIOR LAMP OR THE LIKE

BACKGROUND OF THE INVENTION

This invention relates broadly to the art of insert molding, that is, the molding of plastics articles with metal-made inserts embedded at least in part therein. The insert molding technology according to the invention is of particular utility in conjunction with the manufacture of an electric lamp to be mounted interiorly of a motor vehicle, among many other applications.

Insert molding has been extensively practiced for the manufacture of a variety of products in a variety of industries. One of the difficulties encountered with insert molding is that the inserts are susceptible to deformation or displacement due to the pressure under which the plastic is injected into the mold, and to the subsequent contraction of the injected plastic.

Take for example a motor vehicle interior lamp. It has a plastic lamp body molded in one piece with a pair of bulb terminals, power supply terminals, and a grounding terminal or terminals, which may all be in the form of sheet metal punchings. They are all more or less partly embedded in the lamp body and partly left exposed thereon to perform the various functions for which they are intended. All these inserts may undergo deformation or displacement during insert molding under the fluid pressure of the plastic being injected or due to its subsequent contraction.

Such deformation or displacement is especially undesirable in cases where the inserts, or at least some specific parts thereof, must be held in preassigned positions on the molding. This statement applies in particular to the noted grounding terminals in the case of the motor vehicle interior lamp now under consideration. Interconnected by a conductor strip, which is partly buried in the lamp body, the grounding terminals are in the form of rings which are to be left exposed on the lamp body and which are to be placed in exact register with mounting holes in the lamp body. The grounding terminals are grounded as the lamp is mounted to the motor vehicle by screws inserted in and through the holes in the grounding terminals and in the lamp body.

Difficulties arise because the conductor strip, which may be of considerable length, almost unavoidably undergoes deformation or displacement during the insert molding of the lamp body. As heretofore constructed, the grounding terminals have been easy to move out of register with the mounting holes in the lamp body as a result of such deformation or displacement of their interconnections.

SUMMARY OF THE INVENTION

The present invention seeks, in the art of insert molding, to prevent the displacement of some desired part of an insert relative to the molding in the face of the displacement or deformation of another part of the insert due to the fluid pressure of the plastic being injected into the mold, or to the subsequent contraction of the injected plastic.

Stated in its perhaps broadest aspect, the present invention concerns an insert molded article comprising a body of plastic material molded in one piece with a metal made insert. The insert has a first portion disposed in a preassigned position on the body, a second portion at least partly integrally embedded in the body by insert molding, and a link joining the first and the second portions. The link is formed to include an offset which is capable of deformation in the event of deformation or displacement of the second portion during the insert molding of the body and which is thus effective to hold the first portion in the preassigned position on the body.

As applied to a motor vehicle interior lamp body molded integral with various sheet metal inserts, the present invention may be restated as residing in a grounding insert comprising one or more grounding terminals or rings disposed in register with mounting holes in the lamp body, a grounding conductor at least partly integrally embedded in the lamp body by insert molding, and a link joining each grounding terminal to the grounding conductor. All the links are formed to include an offset readily deformable to take up the possible deformation or displacement of the grounding conductor, thereby serving to maintain the grounding rings in register with the mounting holes in the lamp body.

The above and other features and advantages of this invention and the manner of realizing them will become more apparent, and the invention itself will best be understood, from a study of the following description and appended claims, with reference had to the attached drawings showing a preferred embodiment of the invention.

DESCRIPTION OF THE PREFERRED EMBODIMENT

General

Figure 1:
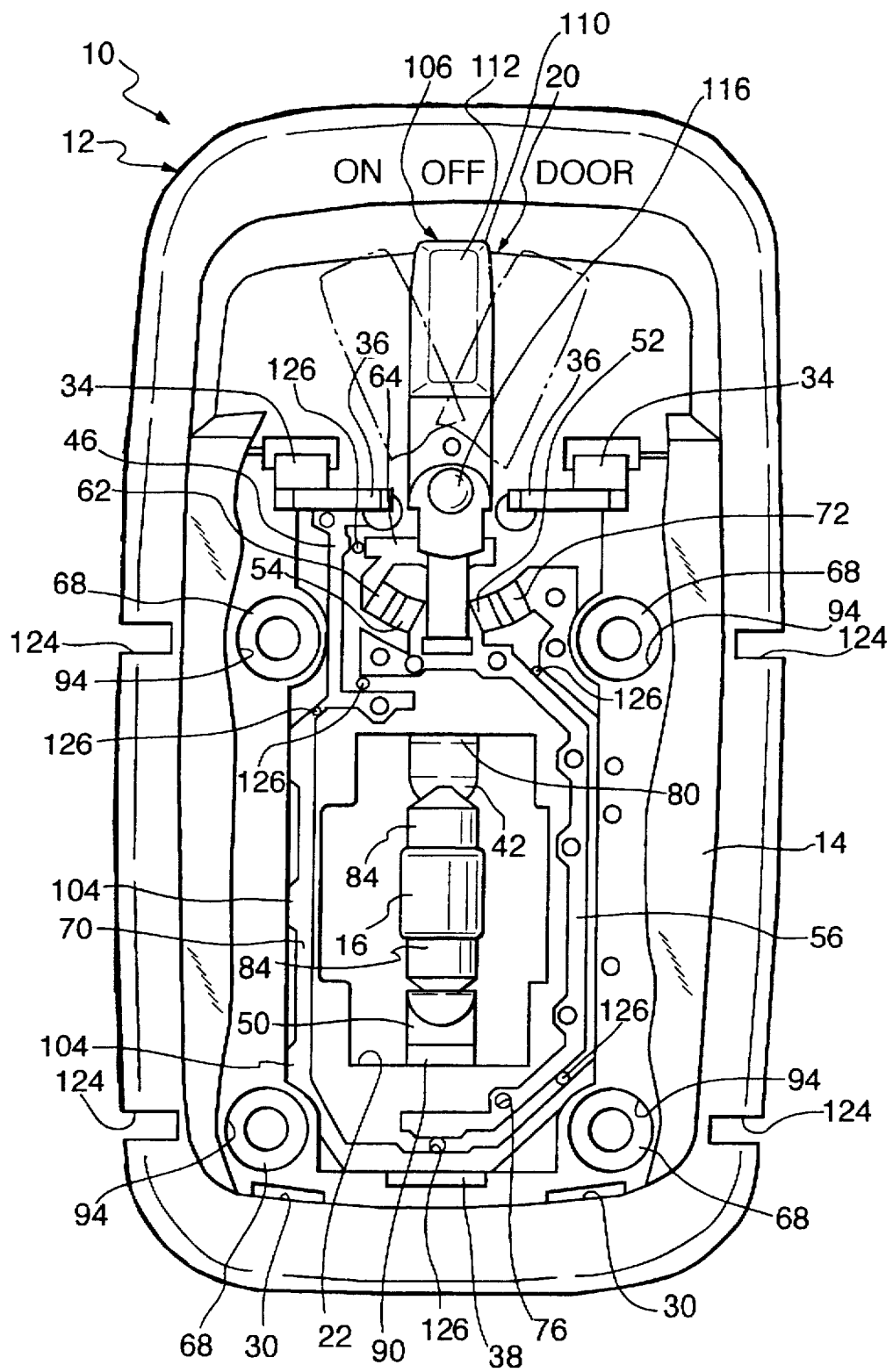
FIG. 1 is a front elevation of a motor vehicle interior lamp constructed in accordance with the novel concepts of the present invention, the lamp being shown with its lens broken away to reveal other parts.

The present invention will now be described in detail as embodied by way of example in the motor vehicle interior lamp illustrated in its entirety in FIGS. 1–5 of the above drawings and therein generally designated 10. The representative lamp 10 comprises a lamp body 12 which is molded from plastics material generally into the shape of a shallow dish, opening forwardly or toward the viewer as seen in FIG. 1 and to the left as seen in FIG. 3. As best revealed by FIG. 3, all but a top portion of the open front side of the lamp body 12 is covered by a lens 14. Behind this lens 14 an electric lighting bulb 16 is mounted to the lamp body 12. The bulb 16 is electrically connected to a power supply circuit 18 shown in detail in FIGS. 6 and 7.

As will be noted from these figures, the power supply circuit 18 is formed by first preparing a unitary punching of sheet metal shown in FIG. 6 and by subsequently pressing this punching into the form pictured in FIG. 7. This pressing of FIG. 7 is partly embedded in the lamp body 12 by insert molding thereby to be compactly mounted thereto without use of fasteners or like mounting means. The insert as depicted in FIG. 7 is still incomplete as the power supply circuit, however, because it has to be disconnected into several electrically separate parts after the insert molding, as will be detailed subsequently.

The lamp 10 further includes an electric selector switch 20, FIGS. 1 and 3, included in or associated with the power supply circuit 18. The selector switch 20 is for manually turning the bulb 16 on and off, as well as automatically according to whether a vehicle door, not shown, is open or closed.

The following is a more detailed discussion of the lamp body 12 together with the lens 14, the power supply circuit 18 with the bulb 16, and the selector switch 20, in that order and under separate headings and, where appropriate, subheadings. How the headlamp 10 is manufactured, particularly with regard to the insert molding of the lamp body 12 with the power supply circuit 18, will be described following the discussion of the listed components.

Lamp Body

With reference to FIGS. 1–5 the lamp body 12 is a one-piece molding of a plastic, with an opening 22 of substantially rectangular shape formed approximately centrally therein. As shown in both FIGS. 2 and 3, a pair of walls 24 of U shaped cross section project rearwardly from the opposite ends of the opening 22 to provide a space for accommodating the lighting bulb 16 with substantial clearances. The space bounded by the pair of walls 24 will therefore be hereinafter referred to as the bulb chamber.

Figure 3:
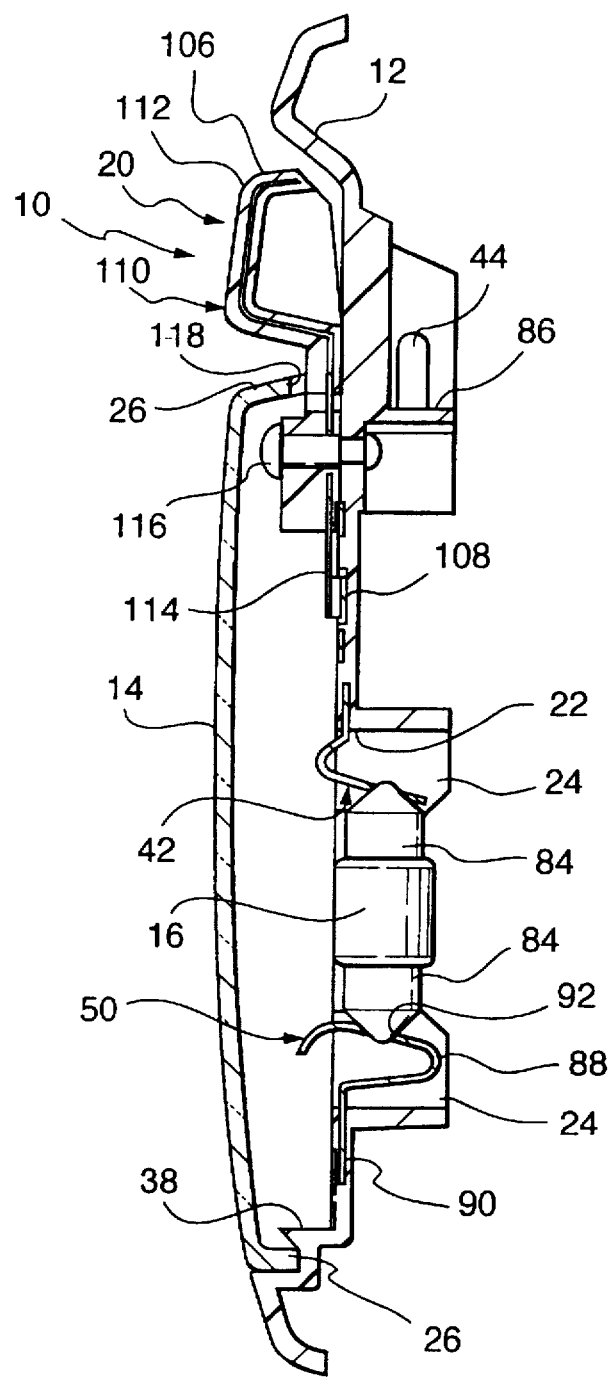
FIG. 3 is a vertical section through the lamp, taken along the line III—III in FIG. 2.
Figure 4:
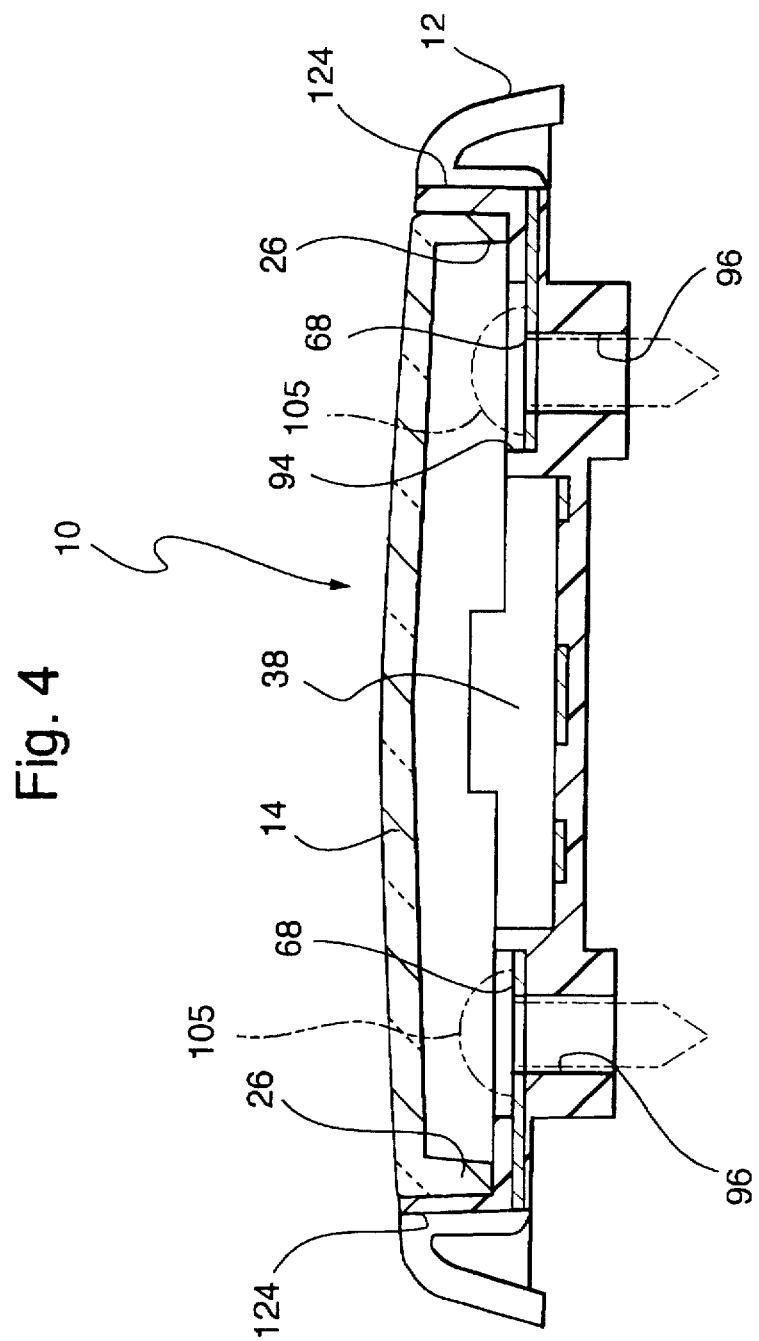
FIG. 4 is a horizontal section through the lamp, taken along the line IV—IV in FIG. 2.
Figure 5:
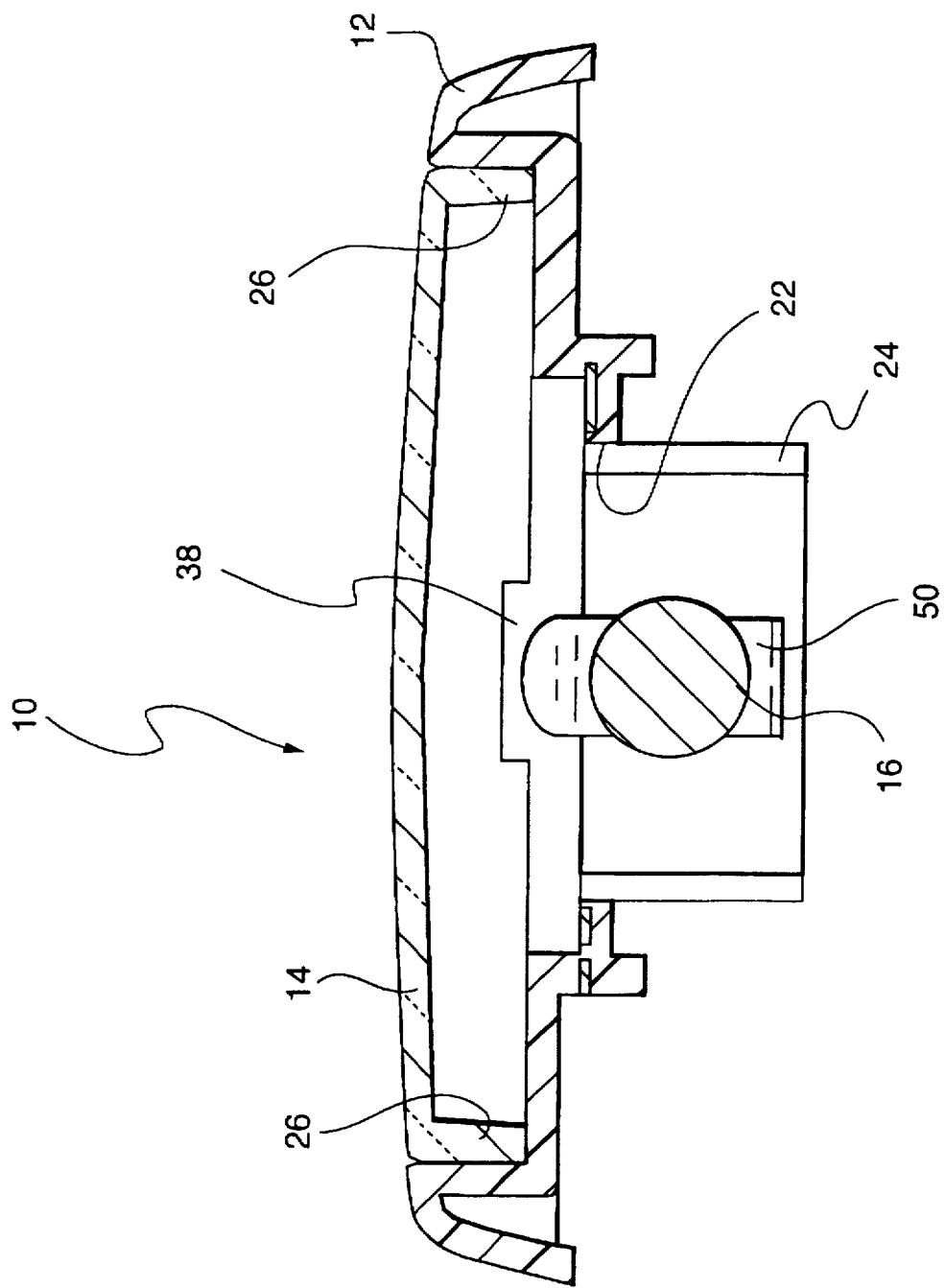
FIG. 5 is another horizontal section through the lamp, taken along the line V—V in FIG. 2.
Figure 8:
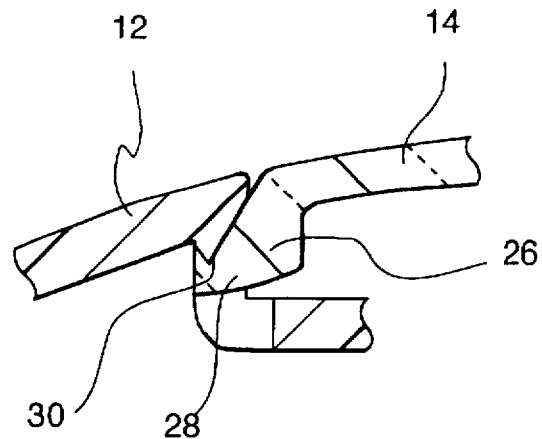
FIG. 8 is an enlarged, fragmentary vertical section through the lamp, showing in particular how the lens is mounted to the lamp body.
Figure 9:
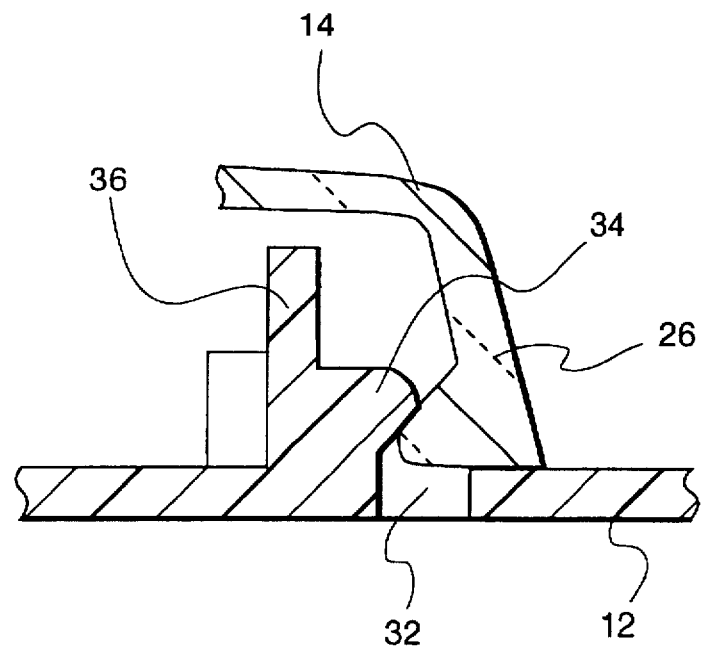
FIG. 9 is also an enlarged, fragmentary vertical section through the lamp, showing in particular how the lens is mounted to the lamp body.

How the lens 14 is mounted to the lamp body 12 will become apparent from a study of FIGS. 8 and 9 taken together with FIGS. 1, 3 and 4. The lens 14 has an annular rim 26 turned rearwardly from its periphery. A pair of downward projections 28, one seen in FIG. 8, are formed on the bottom portion of the lens rim 26 for engagement in respective openings 30 in the lamp body 12. Another pair of projections 32, one seen in FIG. 9, are formed on the top portion of the lens rim 26 for interlocking engagement with respective pawls 34 formed on ledges 36 on the lamp body 12.

Thus the lens 14 can be snapped into position on the lamp body 12, fitting to the shallow space bounded thereby. The bottom portion of the lens rim 26 engages a ledge 38, FIGS. 1 and 3, on the lamp body 12 when the lens is mounted thereto as above.

Power Supply Circuit

Figure 6:
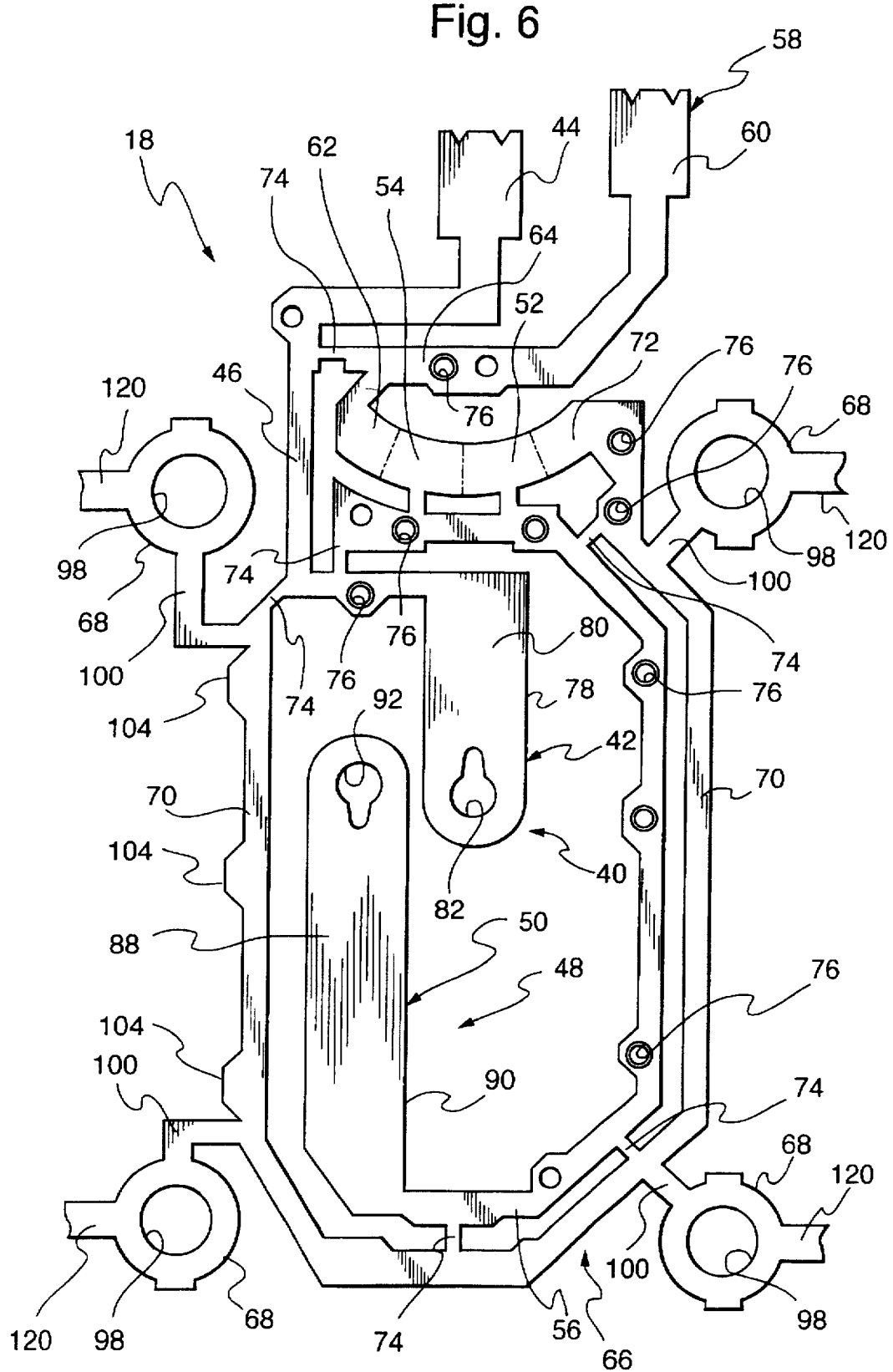
FIG. 6 is an enlarged elevation of a sheet metal punching to be pressed into the power supply circuit of the lamp.
Figure 7:
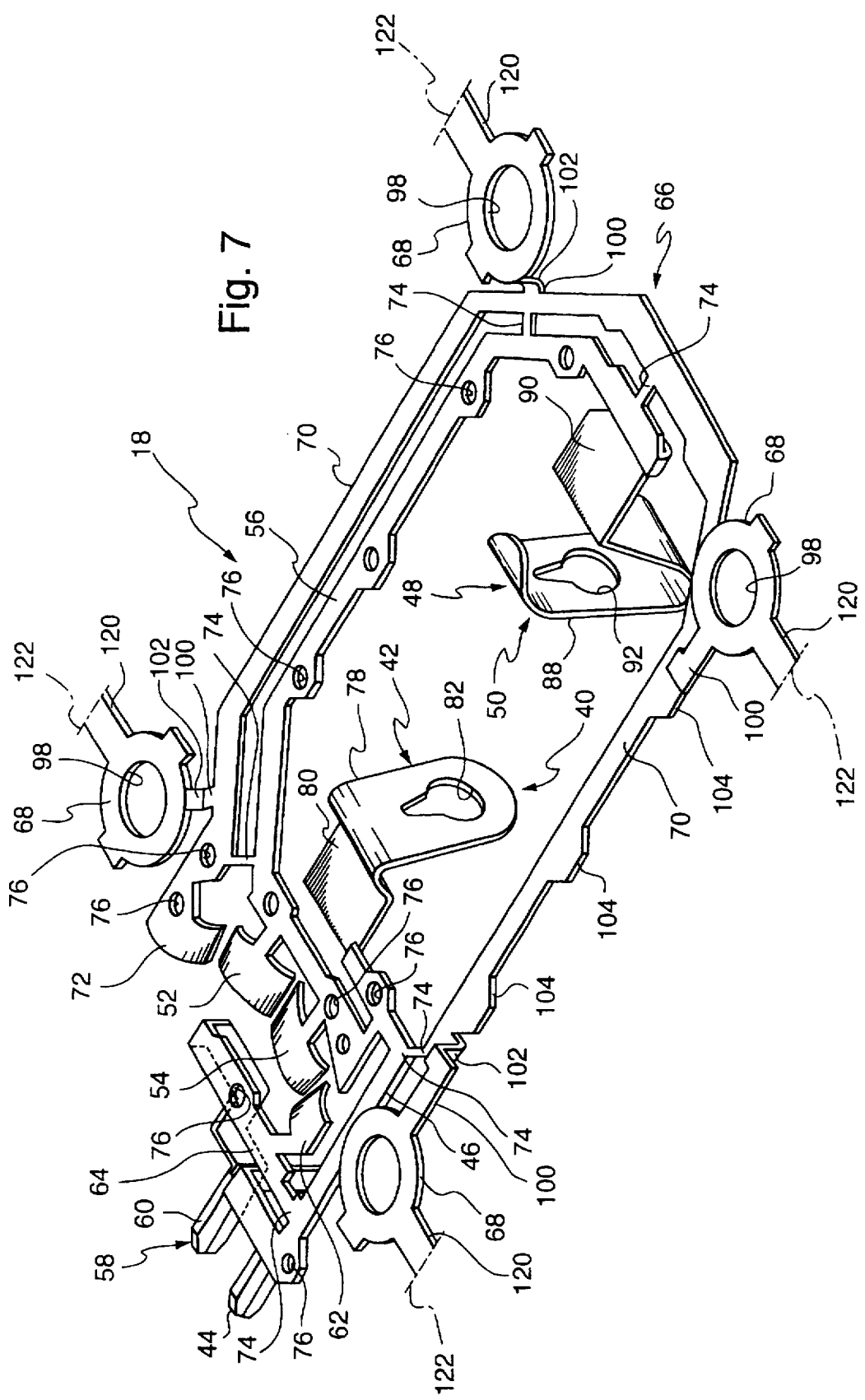
FIG. 7 is a perspective view showing the punching of FIG. 6 after having been pressed into required shape for use as the power supply circuit.

With reference to FIGS. 6 and 7 the power supply circuit 18 is shown to comprise the following four sections: (a) a first bulb terminal section 40 comprising a first bulb terminal 42, a power supply terminal or connector blade 44 to be connected to a power supply, not shown, and a U shaped connective strip 46 connecting the first bulb terminal to the power supply terminal; (b) a second bulb terminal section 48 comprising a second bulb terminal 50, two bulb contacts 52 and 54 making up parts of the selector switch 20, and a U shaped connective strip 56 connecting the second bulb terminal to the two bulb contacts; (c) a door switch section 58 comprising a door switch terminal or connector blade 60 to be grounded via a door switch, not shown, a door switch contact 62 which is another component of the selector switch 20, and a connective strip 64 connecting the door switch terminal to the door switch contact; and (d) a grounding section 66 comprising one or more annular grounding terminals 68 interconnected by a U shaped grounding conductor or connective strip 70, and a grounding contact 72, still another component of the selector switch 20, which is joined to the grounding conductor 70.

It will be noted that all the circuit sections 40, 48, 58 and 66 listed above are shown interconnected by short, slender links 74 in FIGS. 6 and 7. These links are to be punched off after the power supply circuit has been built into the lamp body 12, thereby disconnecting the four circuit sections from one another. Small holes 76 formed in the various connective strips of the circuit sections are intended to receive the plastic during the insert molding of the lamp body 12 for more intimate engagement therewith.

The four circuit sections 40, 48, 58 and 66 will be successively described in more detail hereinbelow.

First Bulb Terminal Section 40

The first bulb terminal 42 comprises a V shaped flap 78 having a base 80 joined to the connective strip 46. The flap 78 has a keyhole shaped aperture 82 for engagement, both electrically and mechanically, with one of a pair of bases 84, FIGS. 1, 3 and 8, of the bulb 16 extending in opposite directions therefrom. As will be noted from FIG. 8, the base 80 of the first bulb terminal 42 is mostly buried in the lamp body 12, with the flap 78 left exposed and projecting into the bulb chamber 22 for engagement with one of the bulb bases 84.

Figure 2:
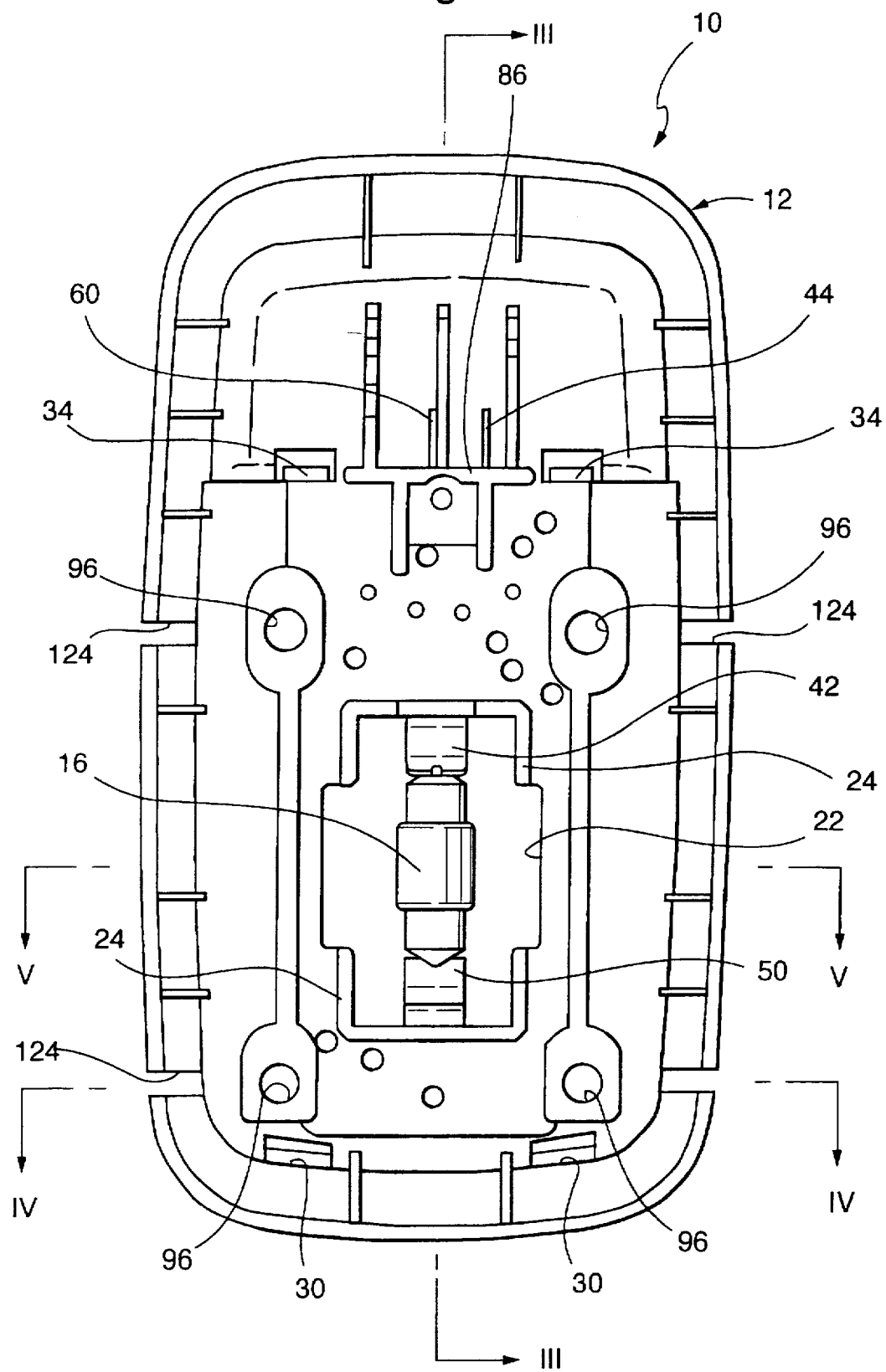
FIG. 2 is a rear elevation of the lamp.

FIGS. 2 and 3 indicate that the power supply terminal 44 is disposed on the back of the lamp body 12, extending upwardly from a ledge 86 thereon in side by side relationship to the door switch terminal 60. The power supply terminal 44 is to be connected to a power supply, not shown, such as a battery. The connective strip 46 is partly buried in the lamp body 12 and ledge 86 but mostly left exposed on the front side of the lamp body 12, as will be understood from FIG. 1. The connective strip 46 will nevertheless remain firmly attached to the lamp body 12 as the plastic material of the lamp body fills the holes 76 in the connective strip.

Second Bulb Terminal Section 48

The second bulb terminal 50 comprises a V shaped flap 88 having a base 90 joined to the connective strip 56. The flap 88 is similar in shape to the flap 78 of the first bulb terminal 42 except that the two flaps are oriented in opposite directions. The flap 88 also has a keyhole shaped aperture 92. The base 90 of the second bulb terminal 50 is also buried in the lamp body 12, with the flap 88 projecting to the bulb chamber 22 for receiving one of the bulb bases 84 in its aperture 92. Thus the bulb 16 is disposed in the bulb chamber 22 by having its bases 84 mechanically engaged with the two bulb terminals 42 and 50.

The two bulb contacts 52 and 54, as well as the connective strip 56, are of course left exposed on the front side of the lamp body 12. The connective strip 56 will stick fast to the lamp body 12 as its plastic material fills the holes 76 therein during insert molding.

A comparison of FIGS. 6 and 7 will reveal that the second bulb terminal 50 is punched out of vertical alignment with the first bulb terminal 42 and then folded over the connective strip 56 into alignment with the first bulb terminal. This offset punching of the two bulb terminals makes it possible to make them longer than in the case where they are punched in alignment.

Door Switch Section 58

The connective strip 64 is partly buried in the lamp body 12, with the door switch terminal 60 left exposed on the back of the lamp body in side by side arrangement with the power supply terminal 44, and the door switch contact 62 left exposed on the front of the lamp body. The door switch terminal 60 is to be grounded via a door switch, not shown, which is open when an associated vehicle door, also not shown, is closed, and which is closed when the door is open.

Grounding Section 66

The grounding section 66 is shown to have four annular grounding terminals 68 which are received one in each mounting hole 94, FIGS. 1, 2 and 4, in the lamp body 12. Each mounting hole 94 is open to, and axially aligned with, a smaller diameter hole 96 in the lamp body 12. Received in the mounting holes 94 and, preferably, peripherally buried in the lamp body 12, the grounding terminals 68 have their holes 98 in register with the smaller diameter holes 96.

The four grounding terminals 68 are joined to the U-shaped grounding conductor 70 via links 100. Each link 100 is bent to have an offset 102 according to a feature of the present invention, such that the grounding terminals 68 and grounding conductor 70 lie in different, parallel planes spaced in the front-to-rear depth direction of the lamp 10.

As will be understood by referring back to FIG. 1, the right hand limb, as seen in this figure, of the grounding conductor 70 is mostly buried in the lamp body 12, with only its top and bottom portions left exposed on the front side of the lamp body. The left hand limb of the grounding conductor 70 is similarly exposed on the lamp body 12 but firmly retained thereon as its lateral protuberances 104 are buried in the lamp body.

The complete grounding section 66 will be grounded as the lamp 10 is mounted in place on a motor vehicle by mounting screws 105, FIG. 4, inserted in and through the holes 98 in the grounding terminals 68 and the holes 96 in the lamp body 12 and engaged in tapped holes in a structural part or parts of the motor vehicle. Only one of the four mounting screws 105 need be electrically coupled to the vehicle chassis for Grounding the grounding section 66, affording a greater latitude for the possible location of the lamp. Moreover, the frame-like grounding conductor 70, interconnecting the four spaced grounding terminals 68, serves to impart greater strength to the punching 18, making it less susceptible to deformation during handling.

Selector Switch

With reference to FIGS. 1 and 3 the selector switch 20 comprises a hand lever 106 carrying a movable contact 108, in addition to the noted four fixed contacts, namely, the first bulb contact 52, second bulb contact 54, door switch contact 62, and grounding contact 72. The switch lever 106 includes a molding 110, including a thumbpiece 112, of plastics material, with an insert 114 of resilient sheet metal material buried therein to impart mechanical strength. The insert 110 projects downwardly from the molding 110 and terminates in the movable contact 108, which is formed by pressing the projecting end of the insert into semicircular shape, as shown cross sectionally and on an enlarged scale in FIG. 10. The hand lever 106 is mounted to the lamp body 12 by a pivot pin shown as a rivet 116 in FIGS. 1 and 3. When the lens 14 is mounted to the lamp body 12, the switch lever 106 extends with clearance through a cutout 118, FIG. 3, in the top rim of the lens, with the movable contact 108 disposed interiorly of the lens, and the thumbpiece 112 exteriorly.

Figure 10:
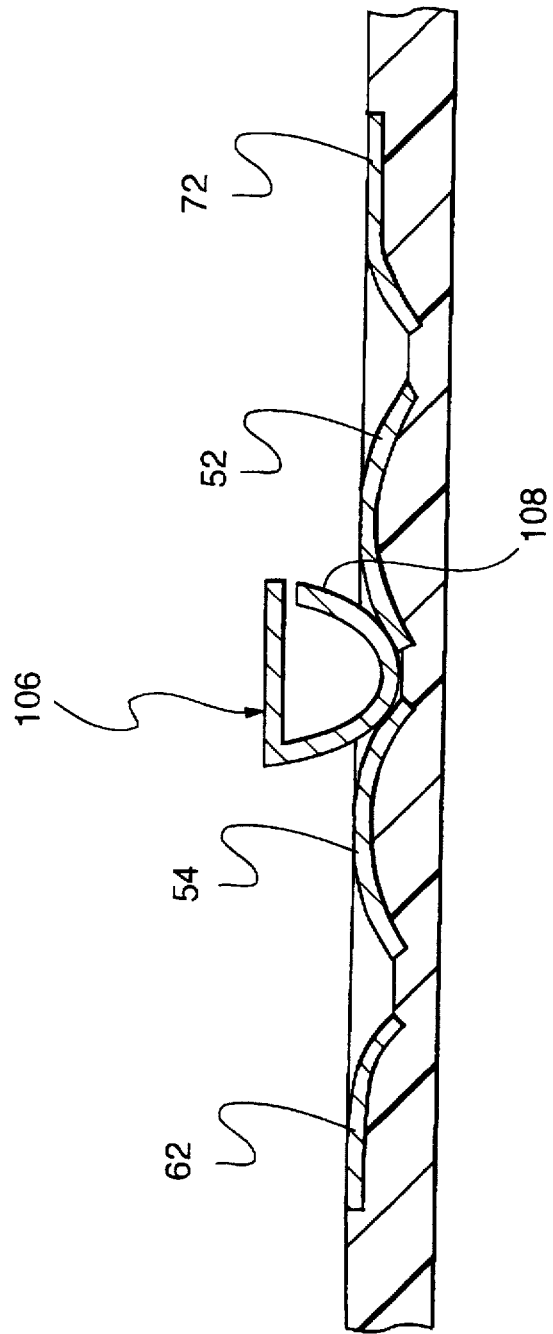
FIG. 10 is an enlarged, horizontal section through the lamp, showing in particular the movable and the fixed contacts of the selector switch.

As will be understood from FIG. 1 taken together with FIG. 10, the movable contact 108 slides along the four fixed contacts 52, 54, 62 and 72 of arcuate arrangement as the switch lever 106 is turned about the pivot pin 1 16. FIG. 10 further indicates that the four fixed contacts are each convexed and spaced from each other to provide three click stops. These stops are: (a) the "OFF" position where the movable contact 108 simultaneously engages both first 52 and second 54 bulb contacts; (b) the "ON" position where the movable contact simultaneously engages both grounding contact 72 and first bulb contact 52; and (c) "DOOR" position where the movable contact simultaneously engages both second bulb contact 54 and door switch contact 62.

Method of Manufacture

There may first be prepared the punching of FIG. 6 to be processed into the power supply circuit 18. Preferably, the punching should be an aggregate of many power supply circuits 18 interconnected in series by links 120 joining the grounding terminals 68 of the neighboring circuits. Then the punched circuit aggregate may be pressed into the shape of FIG. 7. Then lamp bodies 12 may be successively insert molded on the respective power supply circuits 18.

During such insert molding of each lamp body 12 the offset links 100 of the grounding section 66 will take up the injection pressure of the plastic, as well as the subsequent contraction thereof, to prevent the irretrievable deformation of the other parts, notably the grounding terminals 68, of the grounding section. Also, preparatory to the insert molding, the offset links 100 permit ready adjustment of the positions of the grounding terminals 68 into precise register with the mounting holes 94 in the lamp body 12.

Then, having been molded as above on the circuit aggregate, the lamp bodies 12 may be separated from one another by cutting, as by punching, the links 120 at 122, FIG. 7. A reference back to FIGS. 1 and 2 will indicate that the lamp body 12 has recesses 124 to expose parts of the links 120. The links 120 may be cut at the deepest parts of the recesses 124 in order that the severed ends of the links may not jut out from the sides of the lamp body.

Preferably concurrently with the above severance of the links 120, the lamp body 12 with the circuit 18 embedded therein may be punched to create small holes 126, FIG. 1, therein. The positions of these holes 126 agree with those of the links 74, FIGS. 6 and 7, so that all these links are punched off thereby electrically disconnecting the four circuit sections 40, 48, 58 and 66 from one another.

Then the bulb 16 may be mounted between the pair of bulb terminals 42 and 50. Then, preferably before mounting the lens 14 to the lamp body 12, the lamp body may be installed in a desired position on the motor vehicle by the screws 105, FIG. 4, extending through the holes 98 in the grounding terminals 68 and the holes 96 in the lamp body. The grounding contact 72 of the selector switch 20 has now been grounded.

Then the power supply terminal 44 and door switch terminal 60 may be coupled with the connector half, not shown, whereby the terminal 44 and therefore the first bulb terminal 42 are connected to the unshown power supply whereas the terminal 60 and therefore the door switch con-tact 62 is grounded via the unshown door switch.

When the hand lever 106 of the selector switch 20 is in the OFF position, indicated by the solid lines in FIG. 1, the movable contact 108 simultaneously engages both first 52 and second 54 bulb contacts. The second bulb terminal 50 is not grounded when the switch lever 106 is in the OFF position, even though the first bulb terminal 42 is coupled to the power supply. The bulb 16 is therefore unlit.

When the switch lever 106 is turned to the ON position, indicated by the phantom outline in FIG. 1, the movable contact 108 simultaneously engages both grounding contact 72 and first bulb contact 52. The bulb 16 will glow thereupon since the second bulb terminal 50 is now grounded via the grounding terminals 68.

When the switch lever 106 is turned to the DOOR position, also indicated by the phantom outline in FIG. 1, the movable contact 108 simultaneously engages both second bulb contact 54 and door switch contact 62. Now connected to the unshown door switch, the second bulb terminal 50 is grounded when the door is opened, letting the bulb 16 glow. The bulb is unlit, however, as long as the door is closed.

Although the present invention has been shown and described very specifically and as applied to the motor vehicle interior lamp body molded in one piece with the sheet metal inserts, it is not desired that the invention be limited to this particular application. Also, a variety of modifications and alterations of the illustrated embodiment will suggest themselves to one skilled in the art in order to conform to the requirements of each specific application or to design preferences, without departing from the scope of the present invention as expressed in the claims appended hereto.

What is claimed is:

1. An insert molded article comprising:

(a) a body of plastic material; and (b) a metal insert having a first portion disposed in a preassigned position on the body, a second portion at least partly integrally embedded in the body by insert molding, and a link joining the first and the second portions, the link being formed to include an offset which is capable of deformation in the event of deformation or displacement of the second portion during the insert molding of the body and which is thus effective to hold the first portion in the preassigned position on the body and wherein the first portion and the second portion are planes having predetermined surface areas and said metal insert is formed into at least first and second lamp source terminals for mounting a lamp, a power supply terminal and a grounding means before being embedded in said body.

* * * * *